(12) United States Patent
Jang et al.

(10) Patent No.: US 8,937,732 B2
(45) Date of Patent: Jan. 20, 2015

(54) PRINTER MANAGEMENT AND PRINTING CONTROL SYSTEM USED WITH PRINTERS

(75) Inventors: Ki-jung Jang, Gwangmyeong-si (KR); Joon-cheol Park, Seoul (KR); Ji-ha Kim, Seoul (KR)

(73) Assignees: Samsung Electronics Co., Ltd., Suwon-Si (KR); Purun Information & Technology Co., Ltd., Seoul (KR)

( * ) Notice: Subject to any disclaimer, the term of this patent is extended or adjusted under 35 U.S.C. 154(b) by 1752 days.

(21) Appl. No.: 10/832,336

(22) Filed: Apr. 27, 2004

(65) Prior Publication Data

US 2004/0218212 A1 Nov. 4, 2004

(30) Foreign Application Priority Data

Apr. 30, 2003 (KR) .................. 10-2003-0027531

(51) Int. Cl.
*G06F 3/12* (2006.01)
*G06K 15/00* (2006.01)

(52) U.S. Cl.
USPC ....... 358/1.15; 358/1.13; 358/1.14; 358/1.16; 358/1.1

(58) Field of Classification Search
USPC .............. 358/1.15, 1.12, 400, 1.13, 1.1, 1.14, 358/3.28, 3.23, 1.2, 1.16; 380/1.1, 51, 255, 380/54; 705/400; 715/734; 710/263; 709/245; 713/176; 734/734
See application file for complete search history.

(56) References Cited

U.S. PATENT DOCUMENTS

| | | | | |
|---|---|---|---|---|
| 5,699,493 A | * | 12/1997 | Davidson et al. | 358/1.15 |
| 5,978,559 A | * | 11/1999 | Quinion | 358/1.15 |
| 5,995,723 A | * | 11/1999 | Sperry et al. | 358/1.15 |
| 5,999,179 A | * | 12/1999 | Kekic et al. | 715/734 |
| 6,014,651 A | * | 1/2000 | Crawford | 705/400 |
| 6,025,925 A | * | 2/2000 | Davidson et al. | 358/1.15 |
| 6,070,245 A | * | 5/2000 | Murphy et al. | 726/3 |

(Continued)

FOREIGN PATENT DOCUMENTS

| | | |
|---|---|---|
| EP | 1160657 A2 | 12/2001 |
| EP | 1191434 A1 | 3/2002 |

(Continued)

OTHER PUBLICATIONS

European Search Report issued Dec. 19, 2008 in Europe Application No. 04101871.4.

(Continued)

*Primary Examiner* — Firmin Backer
*Assistant Examiner* — Jonathan Beckley
(74) *Attorney, Agent, or Firm* — Staas & Halsey LLP

(57) ABSTRACT

During the performance of a printing command of an application program of a client being connected to a server, the printer status information is provided to the client so that the client can selectively use a variety of printer features. Additionally, printers are effectively managed and controlled so that a printing system has an improved operation speed. The printing system is controlled at a management server. In the printing system having the server, at least one client, and a plurality of printers, each being connected through a communication line, the server has the printer status information. Accordingly, in the performance of a printing command of the client, the client requests the management server for the transmission of the printer status information, receives the requested information, and indicates the received information through an indicating part according to a predetermined form.

26 Claims, 7 Drawing Sheets

(56) References Cited

U.S. PATENT DOCUMENTS

| | | | |
|---|---|---|---|
| 6,115,132 A * | 9/2000 | Nakatsuma et al. | 358/1.14 |
| 6,233,684 B1 * | 5/2001 | Stefik et al. | 713/176 |
| 6,256,750 B1 * | 7/2001 | Takeda | 714/11 |
| 6,266,150 B1 * | 7/2001 | Brossman et al. | 358/1.15 |
| 6,268,924 B1 * | 7/2001 | Koppolu et al. | 358/1.13 |
| 6,321,266 B1 * | 11/2001 | Yokomizo et al. | 709/226 |
| 6,373,585 B1 * | 4/2002 | Mastie et al. | 358/1.15 |
| 6,452,692 B1 * | 9/2002 | Yacoub | 358/1.15 |
| 6,469,796 B1 * | 10/2002 | Leiman et al. | 358/1.15 |
| 6,535,294 B1 * | 3/2003 | Arledge et al. | 358/1.15 |
| 6,535,295 B1 * | 3/2003 | Brossman et al. | 358/1.15 |
| 6,542,252 B2 * | 4/2003 | Brossman et al. | 358/1.13 |
| 6,552,813 B2 * | 4/2003 | Yacoub | 358/1.1 |
| 6,577,407 B1 * | 6/2003 | Kopecki | 358/1.15 |
| 6,598,087 B1 * | 7/2003 | Dixon et al. | 709/236 |
| 6,606,165 B1 * | 8/2003 | Barry et al. | 358/1.9 |
| 6,704,117 B1 * | 3/2004 | Chintakrindi et al. | 358/1.15 |
| 6,718,378 B1 * | 4/2004 | Machida | 709/223 |
| 6,775,729 B1 * | 8/2004 | Matsuo et al. | 710/263 |
| 6,798,530 B1 * | 9/2004 | Buckley et al. | 358/1.13 |
| 6,825,943 B1 * | 11/2004 | Barry et al. | 358/1.15 |
| 6,829,059 B1 * | 12/2004 | Kimura | 358/1.15 |
| 6,856,413 B1 * | 2/2005 | Roosen et al. | 358/1.15 |
| 6,874,034 B1 * | 3/2005 | Hertling | 709/245 |
| 6,943,905 B2 * | 9/2005 | Ferlitsch | 358/1.13 |
| 6,970,259 B1 * | 11/2005 | Lunt et al. | 358/1.14 |
| 6,993,562 B2 * | 1/2006 | Treptow et al. | 709/206 |
| 7,002,702 B1 * | 2/2006 | Machida | 358/1.15 |
| 7,095,523 B2 * | 8/2006 | Brossman et al. | 358/1.15 |
| 7,099,027 B1 * | 8/2006 | Barry et al. | 358/1.15 |
| 7,110,541 B1 * | 9/2006 | Lunt et al. | 380/51 |
| 7,142,322 B2 * | 11/2006 | Lee | 358/1.15 |
| 7,143,290 B1 * | 11/2006 | Ginter et al. | 713/176 |
| 7,145,678 B2 * | 12/2006 | Simpson et al. | 358/1.15 |
| 7,145,686 B2 * | 12/2006 | Simpson et al. | 358/1.18 |
| 7,167,260 B2 * | 1/2007 | Iwata et al. | 358/1.15 |
| 7,177,040 B2 * | 2/2007 | Roosen et al. | 358/1.15 |
| 7,180,623 B2 * | 2/2007 | Kato | 358/1.15 |
| 7,190,477 B2 * | 3/2007 | Ferlitsch | 358/1.15 |
| 7,202,962 B2 * | 4/2007 | Roosen et al. | 358/1.15 |
| 7,215,437 B2 * | 5/2007 | Shima | 358/1.15 |
| 7,233,409 B2 * | 6/2007 | Barry et al. | 358/1.15 |
| 7,258,498 B2 * | 8/2007 | Hatta et al. | 400/62 |
| 7,286,250 B2 * | 10/2007 | Kujirai et al. | 358/1.15 |
| 7,298,514 B2 * | 11/2007 | Nishimura | 358/1.15 |
| 7,312,886 B2 * | 12/2007 | Gomi | 358/1.15 |
| 7,315,889 B2 * | 1/2008 | Ono et al. | 709/223 |
| 7,319,533 B2 * | 1/2008 | Ferlitsch | 358/1.13 |
| 7,363,363 B2 * | 4/2008 | Dal Canto et al. | 709/223 |
| 7,609,400 B2 * | 10/2009 | Kuroda et al. | 358/1.15 |
| 7,839,516 B2 * | 11/2010 | Tomita et al. | 358/1.15 |
| 7,839,518 B2 * | 11/2010 | Gomi | 358/1.15 |
| 2002/0048039 A1 * | 4/2002 | Nishikawa | 358/1.15 |
| 2002/0051200 A1 | 5/2002 | Chang et al. | |
| 2002/0097431 A1 | 7/2002 | Ikegami | |
| 2002/0116439 A1 * | 8/2002 | Someshwar et al. | 709/104 |
| 2002/0163666 A1 * | 11/2002 | Iwata et al. | 358/1.15 |
| 2003/0081241 A1 * | 5/2003 | Simpson et al. | 358/1.15 |
| 2003/0103236 A1 * | 6/2003 | Kato | 358/1.15 |
| 2003/0184787 A1 * | 10/2003 | Kuroda et al. | 358/1.13 |
| 2004/0190042 A1 * | 9/2004 | Ferlitsch et al. | 358/1.15 |
| 2004/0218212 A1 * | 11/2004 | Jang et al. | 358/1.15 |

FOREIGN PATENT DOCUMENTS

| | | |
|---|---|---|
| JP | 09-62630 | 3/1997 |
| JP | 11-085416 | 3/1999 |
| JP | 11-146118 | 5/1999 |
| JP | 2001-34034 | 12/2001 |
| JP | 2002-236570 | 8/2002 |
| KR | 1999-084058 | 6/1999 |
| KR | 2001-29650 | 4/2001 |

OTHER PUBLICATIONS

Japanese Office Action dated Oct. 10, 2006 issued in JP 2004-136634.

Communication issued in European Application No. 04101871.4 on Apr. 7, 2014.

* cited by examiner

FIG. 5

PRINTER MANAGEMENT AND PRINTING CONTROL SYSTEM USED WITH PRINTERS

CROSS-REFERENCE TO RELATED APPLICATIONS

This application claims the benefit of Korean Patent Application No. 2003-27531 filed Apr. 30, 2003, in the Korean Intellectual Property Office, the disclosure of which is incorporated herein by reference.

BACKGROUND OF THE INVENTION

1. Field of the Invention

The present general inventive concept relates to a printer management and printing control system used with printers to enable effective use and management of the printers connected with a communication network. More particularly, the present general inventive concept relates to a printer management and printing control system used with printers, which is capable of providing respective clients, connected with a management server, with status information about the connected printers when printing a command of an application program of the clients' is executed, thereby allowing each client to select various functions.

2. Description of the Related Art

Generally, computers are connected through a LAN (local area network) and share a certain number of printers such that the computers can selectively transfer print data to the printers for printing.

When an application program of a certain client executes a printing command, a predetermined printer driver is operated to transmit print data to a corresponding printer for printing. Accordingly, printing is carried out through the corresponding printer in a predetermined way. However, users can not choose printing conditions of the printers, such as a printing quality and speed.

For example, some printers may have a high quality while others do not. Also, certain printers may be used more frequently than the others. As for the clients, the clients may want a higher printing quality rather than a speed in some instances, or want a fast printing rather than a good printing quality in other instances.

The conventional fixed printing, however, cannot satisfy these requirements. Additionally, the conventional printing is based on a direct printing method, which requires using a corresponding driver of devices in use, and therefore, the user can not fully utilize the respective additional features of the printers, such as text or image insert or printing of a single page in multiple copies.

SUMMARY OF THE INVENTION

Accordingly, the present general inventive concept has been made to solve the above-mentioned and/or problems, and an aspects of the present general inventive concept is to provide a printer management and printing control system used with printers to provide high utilization of connected printers, with which, when a printing command is requested from an application program of a client, status information of the connected printers is displayed in a predetermined format, so that a user is enabled to select desired ways of printing.

Another aspect of the present general inventive concept is to provide a printer management and printing control system used with printers to provide various additional printing features of the printer by storing a metafile, which is recognizable by every printer driver, using a virtual printer driver, such as SecuPrint.

Additional aspects and advantages of the present general inventive concept will be set forth in part in the description which follows and, in part, will be obvious from the description, or may be learned by practice of the general inventive concept.

The above and/or other aspects of the present general inventive concept can be achieved by providing a printer management and printing control system including a server, at least one client, and a plurality of printers, each being connected through a communication line. The at least one client may include an interception agent to drive the virtual printer driver by intercepting a print command including print data sent from an application program, a virtual printer driver, such as SecuPrint, driven by the interception agent to convert the print data sent from the application program into a metafile and to store the metafile, and at the same time, to request a printing of the stored metafile, and a system controller, upon a print request of the virtual printer driver, to transmit printing information including client information to the server, to request the server for the transmission of printer information and current status information of the printers, to receive a print permission information from the server including the printer information and the current status information of the printers, and to indicate the same according to a predetermined format. The server may include a service part to interface data transmission and reception among at least one client and the plurality of printers, each being connected through the communication line, a database part to store therein the client information, the printer information and the current information of the plurality of printers, and printing information sent from the clients, and a controller to determine whether to allow the printing request of the clients, and at the same time, to read out from the database part the printer information and the current status information of the plurality of printers and to transmit the read information to the clients.

The interception agent can intercept APIs (Application Program Interfaces) of all GDIs (Graphic Device Interfaces) detected during the printing request of the application program and transmit the intercepted information to the virtual printer driver.

The print permission information sent from the server may include certain data designated by the server inserted therein.

The certain data may include one of an identification pattern insert for the prevention of unauthorized printing, a barcode insert for the handling of printouts, and a special text insert.

A form of the certain data can be changed to another form when a printout document bearing the certain data is copied, so as to indicate non-authenticity of the copied document.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 5 is a view illustrating management and control menus displayed on a monitor of a management server according to another embodiment of the present general inventive concept;

DETAILED DESCRIPTION OF THE PREFERRED EMBODIMENTS

Figure 1:
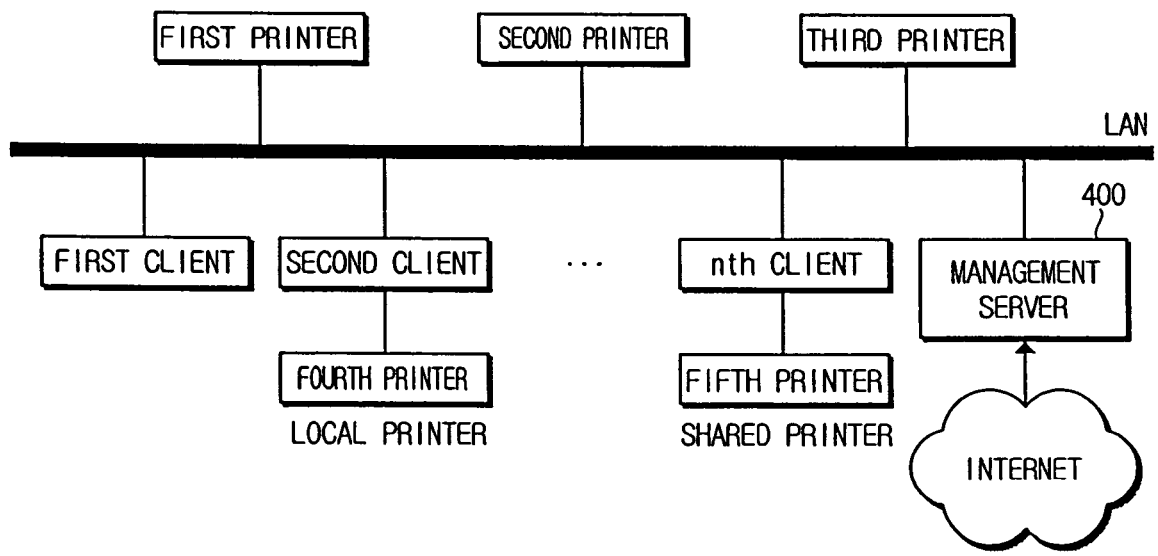
FIG. 1 is a block diagram illustrating an overall structure of a printer management and printing control system used with printers according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures. The matters defined in the description such as a detailed construction and elements are nothing but the ones provided to assist in a comprehensive understanding of the general inventive concept. Thus, it is apparent that the present general inventive concept can be carried out without those defined matters. Also, well-known functions or constructions are not described in detail since they would obscure the general inventive concept in unnecessary detail.

Figure 2:
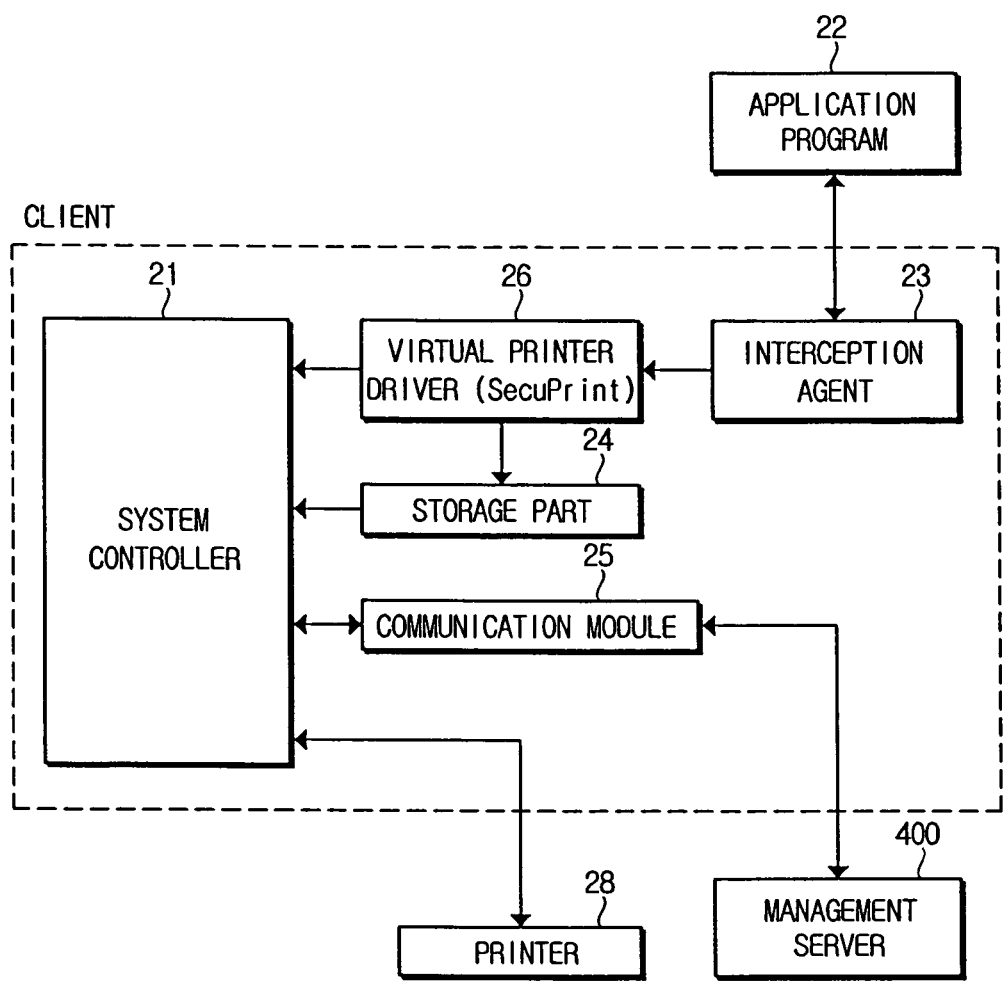
FIG. 2 is a block diagram illustrating a client of the system of FIG. 1.

FIG. 1 is a block diagram illustrating a printer management and printing control system used with printers according to an embodiment of the present general inventive concept, and FIG. 2 is a block diagram illustrating a client of the printer management and printing control system of FIG. 1.

Referring to FIG. 1, this embodiment of the present general inventive concept may employ (n) clients, a management server 400, and three network printers connected through a LAN. Each client can be connected with its local printer, and the management server can be connected with an external device via Internet. FIG. 1 depicts the management server 400 being connected with the LAN. However, any adequate alternatives are possible. For example, the management server 400 may be connected via Internet. Although this embodiment will be described with respect to a particular example of a network printer which is connected through a communication network, the present general inventive concept can be applicable to a plurality of connected printers including a local printer connected directly with each client.

Referring to FIG. 2, the client may include an application program 22 where a printing command is executed. The client may further include an interception agent 23 and a virtual printer driver 26, such as a SecuPrint. The interception agent 23 can be installed in a system, can always be operated in the system, and can not be deletable from the system by a user. The interception agent 23 can intercept a time point of printing by intercepting an API function of all GDIs generated during printing, thereby controlling only the virtual printer driver 26 to perform printing in a printer 28. The virtual printer driver 26 communicates with the GDI of a system controller 21 to store data in a storage part 24 in a form of a device-independent metafile. The client can communicate with the management server 400 through a communication module 25.

Figure 3:
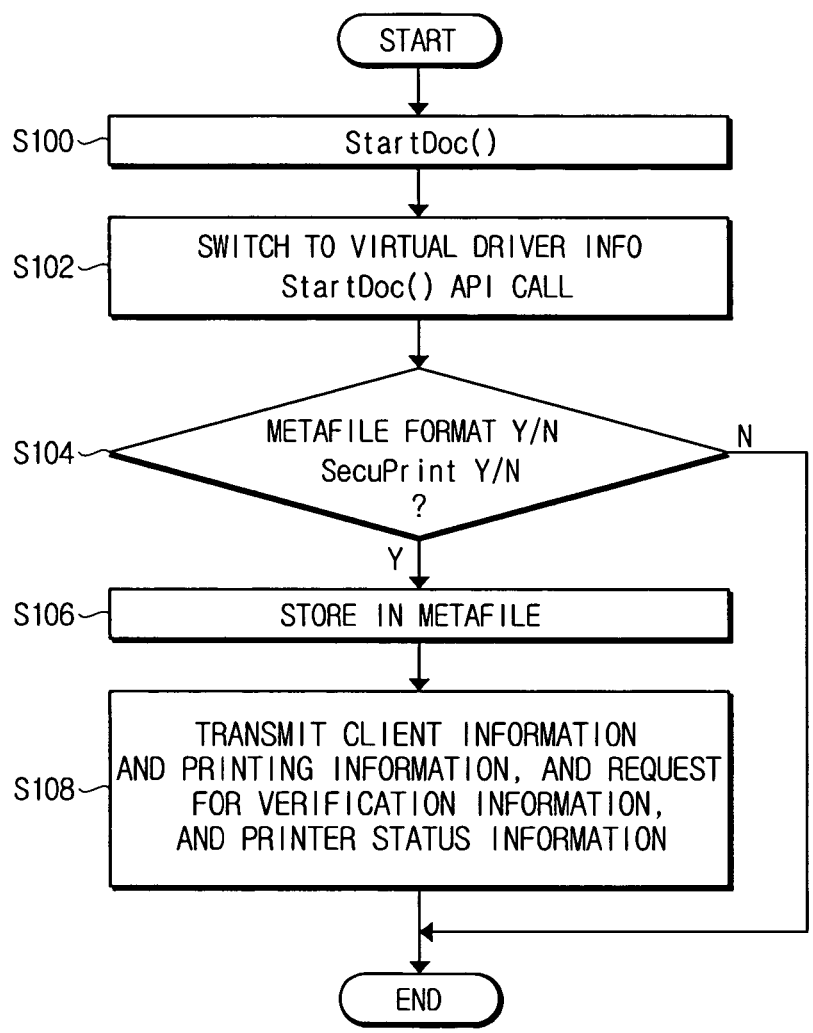
FIG. 3 is a flowchart illustrating a process of an API function interception at a client of FIGS. 1 and 2.

FIG. 3 is a flowchart illustrating a process of intercepting the API function at a client. Referring to FIG. 3, in operations S100 and S102, the interception agent 23 can intercept a printing command 'StartDoc( )' from the application program 22 to drive the virtual printer driver (SecuPrint) 26. The virtual printer driver (SecuPrint) 26 can convert print data into a metafile and store the metafile in the storage part 24 in operations S104 and S106, and if the data is inconvertible to the metafile, can end the process in operation S104.

In operation S108, the virtual printer driver (SecuPrint) 26 can transmit to the management server the client information, such as a client ID, a client name, document information, and printer driver information, and printing information, such as a file name and a file size, through the use of the communication module 25, and can request from the management server 400 verification and status information of the printers, to output the print data.

Figure 4:
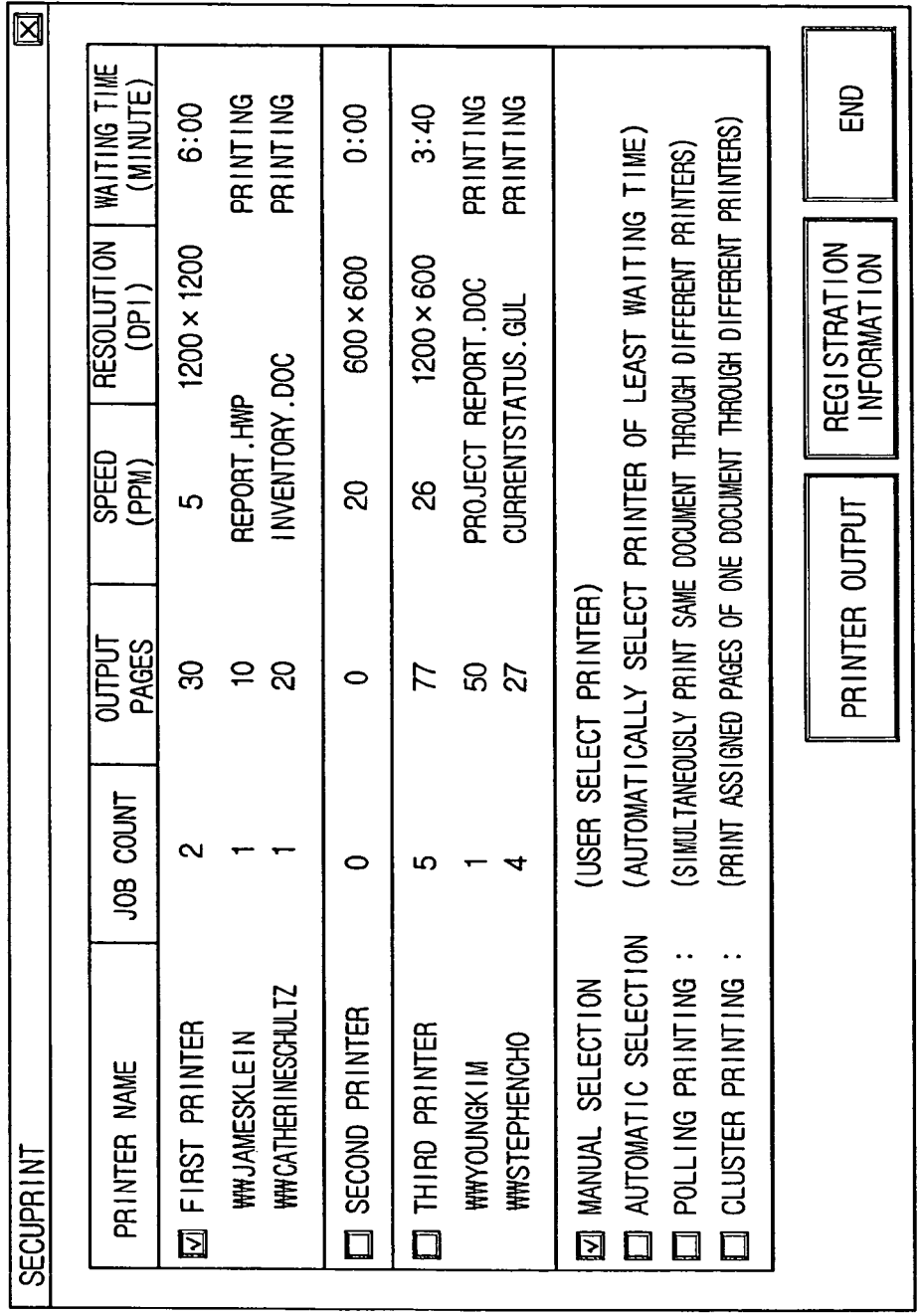
FIG. 4 is a view illustrating status information of a printer to be displayed on a monitor by an agent according to another embodiment of the present general inventive concept.

When the verification and the status information of the printer are received from the management server 400 in the system controller 21, the system controller 21 can output the status information through a monitor (not shown) in a proper pattern shown in FIG. 4. The application program 22, the interception agent 23, the storage part 24, the communication module 25 and the monitor (not shown) may be operated under the control of the system controller 21. Meanwhile, during the verification from the management server 400, the system controller 21 may additionally output special information which was not included in the printing request from the application program 22 for an original document, to the printer. The additional information may be expressed in various ways, such as a text insert, an identification pattern to prevent unauthorized reproducing, and a barcode containing printing information. The text insert may include the name of a printing person, the date of printing, the printer in use, or a security mark for verification. The identification pattern may be configured such that it changes forms when reproduced unduly. The barcode contains the printing information so that it provides detailed information of the printing when read.

FIG. 4 is a view illustrating a screen of printer status information being displayed on the monitor by the control of the system controller 21.

Referring to FIG. 4, the printer status information can include a job count waiting at a first, a second and a third printers all being connected through a network, a number of pages for printout, a printing speed, a printing resolution, a waiting time, and a file name. FIG. 4 specifically shows a case where two print jobs are waiting for the first printer, which are slower than other printers in printing speed but higher in printing resolution. The first printer also shows a relatively longer waiting time, compared with other printers. The second printer has a fast printing speed, but relatively low in printing resolution, and the second printer indicates zero waiting time because there is no current printing job waiting. The third printer is in an intermediate state in printing speed, resolution and waiting time.

When a printing command is received from a certain client in the driving of the application program 22, the virtual printer driver (SecuPrint) 26 can be executed by the interception agent 23, and the system controller 21 can display on the monitor the status information of the printer which is received from the management server 400. Accordingly, the user of the client can select optimum printing conditions, for example, manual selection, automatic selection, cluster printing or polling printing, as well as various factors, such as printing quality of the original document and a printing speed being considered. For example, with the status information of the printer received from the management server 400 as shown in FIG. 4, the user who is more concerned about the printing quality can select the first printer through the manual selection, the user who cares more about the printing speed can select the second printer through the manual selection, and the user who cares more about the printing speed and the waiting time can select the third printer through the manual selection. The user may select the printer having the least printing time automatically through the automatic selection, or can print the print data of one document through a plurality of printers by the polling printing. The cluster printing can provide fast printing by assigning each printer with a printing job suitable for their capabilities. For example, in printing out 1000 pages, pages from 1 to 200 can be printed through a 10 PPM printer, pages from 201 to 400 can be printed through a 20 PPM printer, and pages from 401 to 1000 can be printed through a 50 PPM printer.

Figure 6:
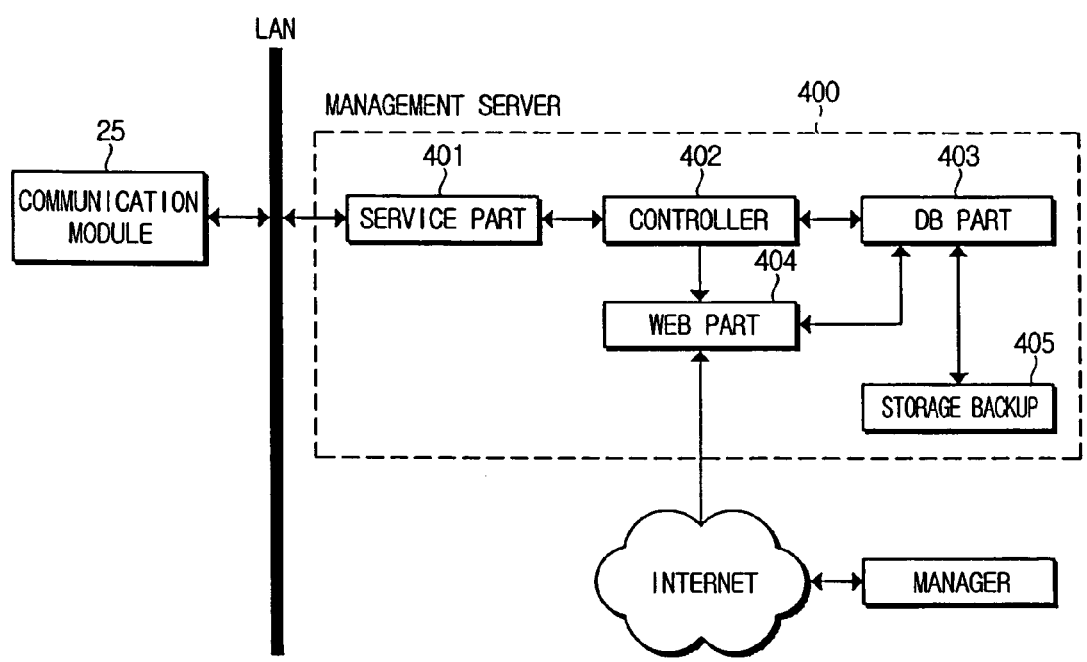
FIG. 6 is a block diagram illustrating a management server according to another embodiment of the present general inventive concept.

FIG. 6 is a block diagram illustrating the management server 400 of FIG. 1. The management server 400 may include a service part 401, a controller 402, a database (DB) part 403, a web part 404, and a storage backup part 405.

The service part 401 can interface transmission and reception of data between the client and the printers of the communication network (LAN) and can be provided with a protection module which prevents break-in by malicious hackers. The DB part 403 can store therein client information, printing information, printer information, printer status information, and security information. The client information can include serial numbers, IPs, and the names of the clients, the printing information can include a file name of print data requested by the clients, a file size, and a file type, and the printer information can include a printing resolution and a printing speed. The printer status information can include a printing job and a waiting time, and the security information can include files with a limited access and one who gives authority to print the files. The web part 404 is connected with an external Internet to enable an external administrator to view the data and to control printing through the Internet.

Figure 5:
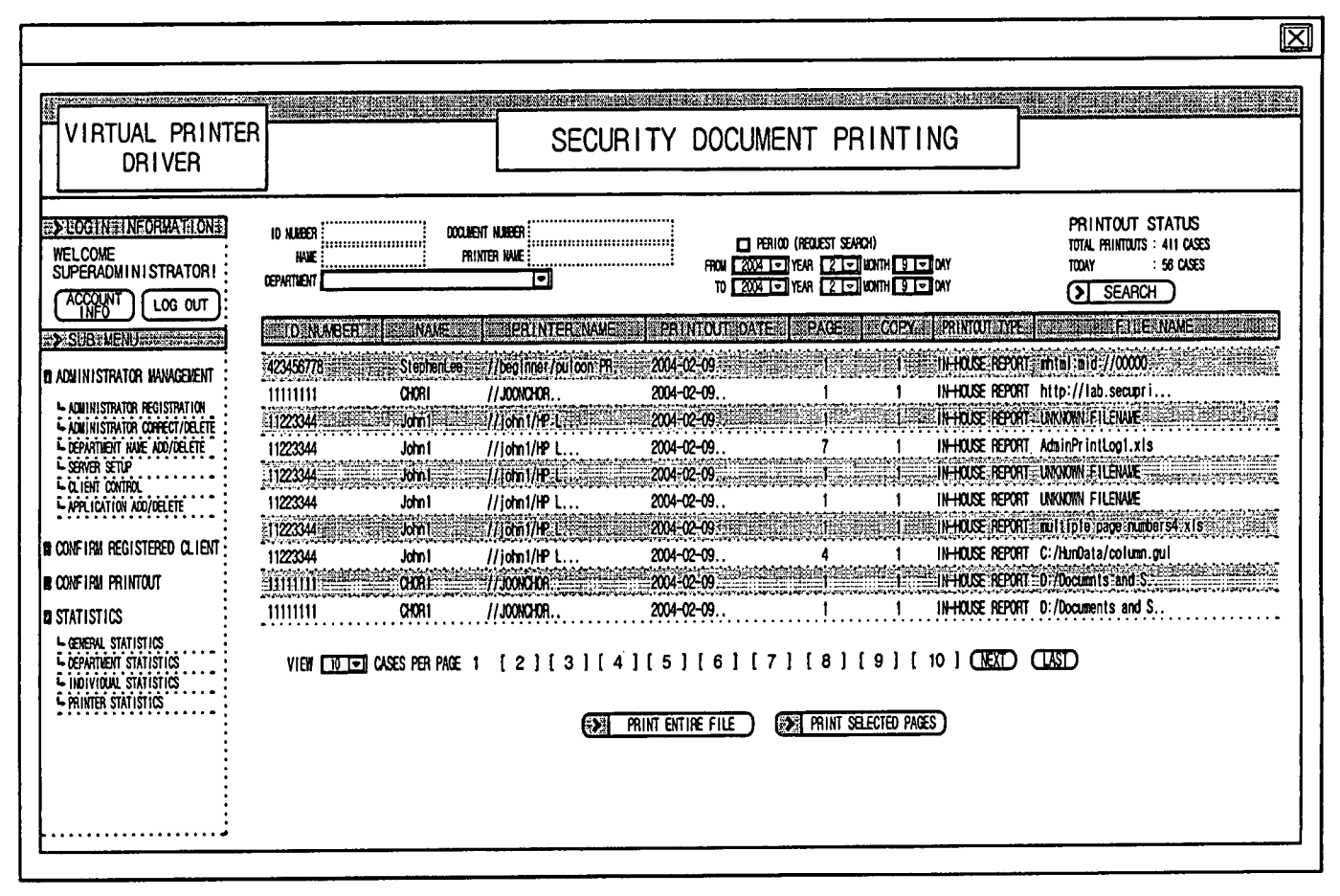

The service part 401, the web part 404, and the DB part 403 can be operated under the control of the controller 402, and the controller 402 can determine whether to print or not based on the comparison of the printing information and the client information of the service part 401, such as the serial number, IP, client name, and file name, with those of the DB part 403. If printing is allowed, the controller 402 can read the current status information of the printers from the DB part 403 and transmit the read information to the client. At this time, a menu screen as shown in FIG. 5, can be displayed on the monitor of the management server 400 for the management and control of the printers. The menu screen can also be provided to remote systems via the Internet, through the web part 404. Accordingly, the external administrator can also manage and control the printers from the remote places.

Meanwhile, if the management server 400 can allow printing, the printer information and the current status information of the printer can be displayed on the monitor of the client (see FIG. 4) by the system controller 21 of the client. If the user of the client responds to the use of a certain printer, the system controller 21 can transmit the use information of the certain printer to the management server 400 via the communication module 25. The controller 402 of the management server 400 can selectively store the printer use information transmitted from the client in the DB part 403, and transmit control commands to the certain printer and the client to operate the certain printer according to the printer use information. When the control commands are received, the system controller 21 of the client can operate the virtual printer driver 26 to read out and transmit the metafile of the storage part 24 to the printer so that the printer can perform printing.

Figure 7:
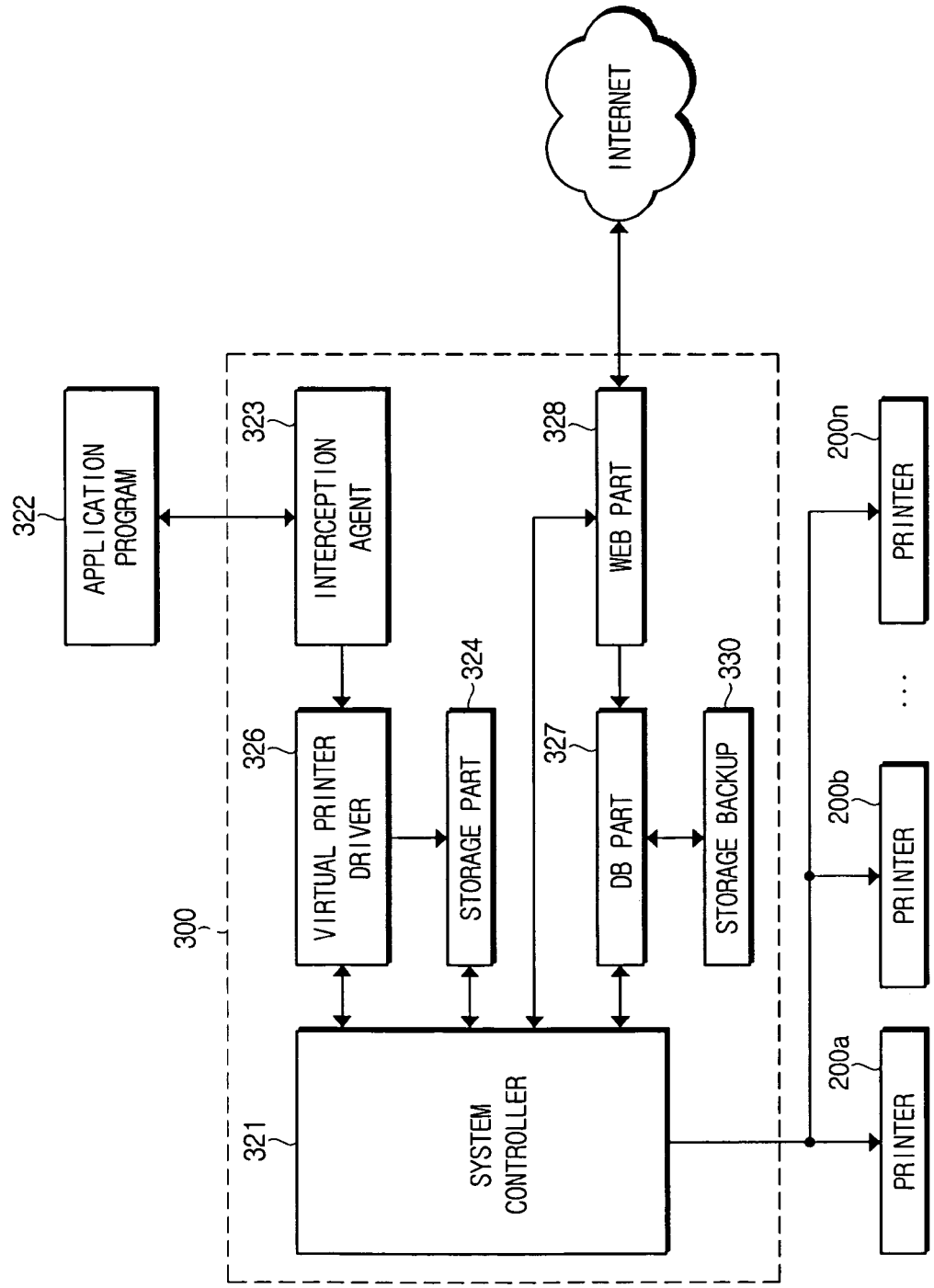
FIG. 7 is a block diagram illustrating a printer management and printing control system according to another embodiment of the present general inventive concept.

FIG. 7 is a block diagram illustrating a printer management and printing control system according to another embodiment of the present general inventive concept. Referring to FIG. 7, a printer 200a, 200b ... 200n can be connected to one client 300. The client 300 can be installed with a variety of application programs 322 and can include an interception agent 323, a virtual printer driver 326, a system controller 321, a database (DB) part 327, a web part 328 and a storage backup 330.

The operations of the interception agent 323, the virtual printer driver 326, the system controller 321, the DB part 327, the web part 328 and the storage backup 330 can be substantially identical to those of the interception agent 23, virtual printer driver 26, system controller 21, DB part 403, web part 404, and storage backup 405 in the embodiment of FIGS. 1, 2, and 6, and therefore, description thereof will be omitted, and the main difference of this embodiment is discussed below. The main difference of this embodiment from the embodiment of FIGS. 1, 2, and 6 lies in the fact that the operation of the management server can be processed within the client 300. More specifically, the system controller 321 can divide and store the printing information which is transmitted from the virtual printer driver 326 with the print request in the DB part 327, compare the printing information with the printing information stored in the DB part 326, and accordingly determine whether to permit the printing or not. If the system controller 321 permits the printing, the printer information and current status information can be read out from the DB part 327, and displayed on the monitor (see FIG. 4). Additionally, special information, which does not exist in the original document requested by the application program 322, can also be outputted. The special information may include a text insert, an identification pattern to prevent unauthorized reproducing, and a barcode containing printing information.

As described above in a few embodiments of the present general inventive concept, in a state that a plurality of clients, a server and a plurality of printers are connected through a communication line, each client can receive status information of the printers and can selectively have print data printed through a certain printer with desired conditions, speed and resolution.

Additionally, according to the settings of the management server, a variety of information can be inserted in the printed documents, regardless of the contents of the original print data. For example, identification information to prevent unauthorized copying can be provided, or a barcode can be inserted in the printed documents so that documents can be handled electronically. According to one aspect of the present general inventive concept, special features of the printer, such as image insert or printing of a single page in multiple copies, can be supported, to enable printing of document in various forms.

According to the embodiments of the present general inventive concept, the management server can control partial, or overall printing operations with respect to the clients so that unauthorized access to the documents can be prevented.

The foregoing aspects and advantages of the general inventive concept are merely exemplary and are not to be construed as limiting thereof. The present teachings can be readily applied to other types of apparatuses. Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A printer management and printing control system comprising;
   a plurality of printers;
   a client; and
   a server connected directly to the client and the plurality of printers through a network,
   wherein, if there is a printing request from the client, the server determines whether to permit the printing request from the client according to client information and printer information, and if the printing request from the client is permissible, the server transmits print permission information including printer information, current status of the plurality of printers and additional information designated by the server,
   wherein, the client comprises;
   a virtual printer driver to convert print data sent from an application program into a metafile, to store the metafile, and to request a printing of the stored metafile,
   an interception agent to drive the virtual printer driver by intercepting a time point of printing and a print command including the print data sent from the application program, and
   a system controller, upon the printing request of the virtual printer driver, to transmit printing information including client information to the server, to request the server to transmit printer information and current status information of the plurality of printers, to receive print permission information including the printer information, the current status information of the plurality of printers and the additional information from the server, to display the printer information and the current status information according to a predetermined format, and to print the stored metafile with the additional information from a printer selected from the plurality of printers through the displayed printer information and the current status information of the plurality of printers,
   wherein the additional information comprises one of an identification pattern insert to prevent unauthorized printing, a barcode insert to handle printouts, and a special text insert.

2. The printer management and printing control system of claim 1, wherein the server comprises:
   a service part to interface data transmission and reception with the client and the plurality of printers;
   a database part to store therein the client information, the printer information and the current information of the plurality of printers, and the printing information sent from the client; and
   a controller to determine whether to permit the printing request of the client, and if is determined to permit the printing request of the client, to read out from the database part the printer information and the current status information of the plurality of printers, and to transmit the read out printer information and current status information of the plurality of printers to the client.

3. The printer management and printing control system of claim 1, wherein the system controller controls such that the stored metafile is transferred to the selected printer to print.

4. The printer management and printing control system of claim 1, wherein the interception agent intercepts application program interfaces (APIs) of graphic device interfaces (GDIs) detected during the print command of the application program, and transmits the intercepted information to the virtual printer driver.

5. The printer management and printing control system of claim 1, wherein a form of the additional information is changed into another form when a printout document bearing the additional information is copied, so as to indicate non-authenticity of the copied document.

6. The printer management and printing control system of claim 1, wherein the client is directly connected to a local printer.

7. A printer management and printing control method of a printing system, the method comprising:
   storing status information of a plurality of printers, client information, and printing information in a server connected directly to the plurality of printers and at least one client through a communication line;
   upon a print command from the client, requesting from the server transmission of printer status information and receiving the requested information; and
   displaying the received printer status information through a display unit according to a predetermined format,
   wherein, if the print command is received from the at least one client, the server determines whether to permit the print command according to the stored printing information and the stored client information, and if the print command is permissible, the server transmits print permission information including the printer status information and additional information designated by the server and prints the additional information with print data corresponding to the print command from a printer selected from the plurality of printers through the displayed printer status information, wherein the additional information comprises one of an identification pattern insert to prevent unauthorized printing, a barcode insert to handle printouts, and a special text insert.

8. A printer management and printing control system having at least one connected printer, comprising:
   a virtual printer driver to convert print data from an application program into a metafile, to store the metafile, and to request a printing of the stored metafile;
   an interception agent to intercept a printing command including the print data from the application program and to drive the virtual printer driver;
   a database to store therein client information, first printing information, printer information, and current status information of the at least one connected printer; and
   a system controller to divide second printing information from the printing request of the virtual printer driver and to store the divided second printing information in the database, and upon the printing request from the virtual printer driver, to determine whether to permit printing or not according to the client information and the first printing information, to read out the current status information from the database and to display the read out information in accordance with a predetermined pattern,
   wherein, when the system controller permits printing, the system controller outputs additional information designated by the system controller to be printed with the metafile, wherein the additional information comprises one of an identification pattern insert to prevent unauthorized printing, a barcode insert to handle printouts, and a special text insert.

9. The printer management and printing control system of claim 8, wherein the system controller compares the second printing information from the printing request of the virtual printer driver with the first printing information stored in the database to determine whether to permit printing or not.

10. The printer management and printing control system of claim 8, wherein, when the system controller permits printing, the virtual printer driver transmits the stored metafile to the printer to be printed.

11. The printer management and printing control system of claim 8, further comprising a storage part to store the metafile.

12. The printer management and printing control system of claim 8, further comprising a web part to provide a communication interface with an external Internet.

13. The printer management and printing control system of claim 8, wherein the interception agent intercepts application program interfaces (APIs) of graphic device interface (GDIs) detected during the printing command of the application program, and transmits the intercepted information to the virtual printer driver.

14. The printer management and printing control system of claim 8, wherein a form of the additional information is changed into another form when a printout document bearing the additional information is copied so as to indicate non-authenticity of the copied document.

15. A printer management and printing control method of a printing system having a plurality of printers, the method comprising:
   storing client information, first printing information, a printer information, and current status information of at least one printer of the plurality of printers in a database connected to a host apparatus;
   driving a virtual printer driver by intercepting a print command including print data from an application program;
   converting the print data into a metafile, storing the metafile, and requesting a printing of the stored metafile; and
   dividing second printing information from the printing request of the virtual printer driver and storing the divided second printing information in the database, and upon the printing request from the virtual printer driver, determining whether to permit printing or not according to the first printing information and the second printing information, reading out the printer information and the current status information from the database and displaying the read out information in accordance with a predetermined pattern,
   wherein, when the printing of the print data is permitted, outputting additional information designated by the printing system to be printed with the metafile, wherein the additional information comprises one of an identification pattern insert to prevent unauthorized printing, a barcode insert to handle printouts, and a special text insert.

16. The printer management and printing control method of claim 15, further comprising:
   selecting one printer among the plurality of printers to which the stored metafile is transferred to print.

17. A printer management and printing control system having one or more connected printers, comprising:
   a virtual printer driver to convert print data into a metafile and to request printing of the metafile; and
   a system controller to store client information, printing information included with the printing request, and information about the one or more printers, and to determine whether to permit the printing request according to the client information and the printing information,
   wherein if the printing request is permitted, to display the information about the one or more printers and to select at least one of the one or more connected printers to print the metafile through the displayed information,
   wherein, when the system controller permits printing, the system controller outputs additional information designated by the system controller to be printed with the metafile, wherein the additional information comprises one of an identification pattern insert to prevent unauthorized printing, a barcode insert to handle printouts, and a special text insert, and
   wherein the information about the one or more printers includes printer information and current status information of the one or more connected printers.

18. The printer management and printing control system of claim 17, wherein the system controller generates a graphic interface including at least one of a job count, a number of pages, a speed, a resolution, and a waiting time as the displayed information.

19. The printer management and printing control system of claim 17, wherein the metafile comprises a first page and a second page, the selected at least one printer comprises a first printer and a second printer, and the system controller controls the first printer and the second printer to print the first page and the second page, respectively.

20. The printer management and printing control system of claim 17, wherein the one or more printers each store information corresponding to at least one of a speed, a resolution, and a waiting time.

21. The printer management and printing control system of claim 17, wherein the displayed information comprises sections corresponding to the one or more printers, and at least one of the one or more printers is selected through the sections of the displayed information to print the metafile according to a user preference.

22. The printer management and printing control system of claim 17, wherein at least one of the one or more printers is automatically selected to print the metafile according to a predetermined user preference which corresponds to at least one of a speed, a resolution, and a waiting time.

23. A printer management and printing control method of a system connected to one or more printers, the method comprising;
   converting print data into a metafile and requesting printing of the metafile;
   storing client information, printing information included with the printing request, and information about the one or more printers;
   determining whether to permit the printing request based on the client information and the printing information; and
   displaying the information about the one or more printers to select at least one of the one or more printers to print the metafile,
   wherein, when the printing request is permitted, additional information designated by the system is outputted by the system to be printed with the metafile, wherein the additional information comprises one of an identification pattern insert to prevent unauthorized printing, a barcode insert to handle printouts, and a special text insert, and
   wherein the displayed information includes printer information and current status information of the one or more printers.

24. A printer management and printing control system comprising:
   a client connectable to an external server and a plurality of external printers to receive information on the plurality of external printers, and to generate a signal to display a window representing the information including the plurality of the external printers and at least one of a file name, a job count, a number of pages for printout, a printing speed, a printing resolution, and a waiting time of the respective printers, wherein the external server determines whether to permit a request to print data according to a comparison of client information and printing information transmitted from the client to the external server with client information and printing information stored in the external server, and wherein, when the printing of the print data is permitted, additional information designated by the printer management and printing control system is printed with the print data, wherein the additional information includes at least one of an identification pattern insert to prevent unauthorized printing, a barcode insert to handle printouts, and a special text insert.

25. The printer management and printing control system of claim 24, wherein the client transmits the additional information to a selected at least one of the plurality of external printers.

26. The printer management and printing control system of claim 25, wherein the additional information further includes at least one of a name, a date, a printer name, and a security mark.

* * * * *